United States Patent Office 3,340,199
Patented Sept. 5, 1967

3,340,199
AZEOTROPIC HALOGENATED HYDROCARBON-ALCOHOL SOLVENT COMPOSITION
William Maxwell Clay and Gerald Yeats, Runcorn, England, assignors to Imperial Chemical Industries Limited, London, England, a corporation of Great Britain
No Drawing. Filed Mar. 22, 1965, Ser. No. 441,867
Claims priority, application Great Britain, Apr. 21, 1964, 13,640/64
1 Claim. (Cl. 252—171)

This invention relates to a cleaning composition comprising isopropanol and 1,1,2 - trichloro-1,2,2 - trifluoroethane.

It is known that 1,1,2-trichloro-1,2,2-trifluoroethane, on account of its selective solvent power, is useful as a cleaning liquid for the removal of contaminants from a variety of articles and materials, particularly synthetic organic polymers and plastics which are themselves sensitive to other more common and more powerful solvents, such as trichloroethylene or perchloroethylene; however, 1,1,2-trichloro-1,2,2-trifluoroethane when used on its own is often insufficient to remove some of the more persistent forms of contamination, for example various resin-bonded soldering fluxes. Some improvement in the efficiency of removal of such persistent contamination may be effected by the use of mechanical aids, for example boiling solvent or ultrasonic irradiation, but use of these mechanical aids is not always sufficient to remove all of the contamination.

We have now found that an improved cleaning fluid may be made which comprises isopropanol and 1,1,2-trichloro-1,2,2-trifluoroethane. Such a composition will remove some contaminants which are not removed by 1,1,2-trichloro-1,2,2-trifluoroethane alone, and also will not attack some materials which are attacked by isopropanol alone. In processes which use a cleaning fluid, it is usually necessary from time to time to remove contamination from the liquid by distillation. Such distillations will normally be repeated many times during the useful life of the fluid and if the cleaning fluid consists of two different liquids having different boiling points these distillations will tend to result in a concentration of one of the liquids and a change of the composition in the cleaning bath. Such a change of composition will cause a change in the solvent power of the cleaning fluid and may result in damage to the articles being cleaned or in the production of a dangerously inflammable mixture. However, we have now found that isopropanol and 1,1,2-trichloro-1,2,2-trifluoroethane form an azeotropic mixture, by use of which it is possible to avoid any risk of such undesirable consequences.

Thus according to our invention we provide a composition comprising isopropanol and 1,1,2-trichloro-1,2,2-trifluoroethane, and preferably an azeotropic mixture of these compounds.

The azeotropic mixture contains about 97% by weight of 1,1,2-trichloro-1,2,2-trifluoroethane and about 3% by weight of isopropanol and has a boiling point of about 46.5° C. at 760 mm. pressure and a specific gravity of 1.53 gms. per ml. at 20° C.

Compositions according to our invention have the advantage that they provide a range of solvents which have a greater solvent power than 1,1,2-trichloro-1,2,2-trifluoroethane while, surprisingly, still retaining to a great extent the inertness of 1,1,2-trichloro-1,2,2-trifluoroethane to synthetic organic polymers, plastics, resins, resin laminates, resin-bonded paper board, bakelite, fibreglass and like materials.

This enhanced solvent power enables us to avoid the use of time-consuming, costly and sometimes unacceptable mechanical devices such as hand-scrubbing or wiping which may cause damage to sensitive articles.

A further advantage of our compositions is that they are non-inflammable (as shown by the conventional closed-cup method of determining flash point) when the isopropanol is present in less than about 70% by weight. We therefore prefer to use such compositions and especially compositions containing more than 90% 1,1,2-trichloro-1,2,2-trifluoroethane. The azeotropic mixture also has the considerable advantage that it may be distilled without preferential concentration of one of the components.

The azeotropic mixture may be used in most of the normal applications of 1,1,2-trichloro-1,2,2-trifluoroethane provided that the increased solvent power of the azeotrope is not a hindrance to such an application. This increased solvent power may make it possible to shorten the cleaning cycles which are at present necessary with pure 1,1,2-trichloro-1,2,2-trifluoroethane and thus enable the capacity of existing plant to be increased. The azeotropic mixture may also be used in conjunction with a surface active agent (and optionally ultrasonic irradiation) in cleaning and in drying operations, particularly in the cleaning and drying of metallic, glass or plastic articles.

The compositions of our invention may be used in conventional apparatus and employing conventional operating techniques. The solvent may be used without heat if desired, but the cleaning action of the solvent may be assisted by conventional means, for example use of boiling solvent, agitation or adjuvants.

In some applications it is advantageous to use ultrasonic irradiation in combination with our solvents. This is particularly true when removing certain tenacious fluxes from soldered joints, the ultrasonic irradiation helping to remove the solid and insoluble constituents of the flux. It has been reported that ultrasonic irradiation may be harmful to semi-conductors such as transistors and we have confirmed that there may be some justification for these reports on certain types of semi-conductors when low frequency ultrasonic irradiation (for example about 25 kc./s) is used, but we have found that irradiation of transistors when immersed in the bath of the azeotrope has had no detrimental effect when using a higher frequency (for example about 40 kc./s.) in a liquor-vapour process and immersion times of from 30 seconds to 30 minutes.

The high stability of the solvent composition of our invention, and particularly of the azeotrope, under operating conditions makes it usually unnecessary to use stabilisers in the solvents. This has the advantage that when the solvent composition evaporates it leaves a perfectly clean surface uncontaminated with higher boiling stabilisers. However it is possible that stabilisers may be necessary under corrosive conditions for example those in which the solvent comes into contact with oxidising agents which can attack the isopropanol. We also envisage the addition of other solvents or additives to the solvent compositions of our invention which will increase its cleaning or solvent power, for example surface active agents such as cetyl pyridinium bromide, and dialkyl dimethyl ammonium chlorides.

The 1,1,2-trichloro-1,2,2-trifluoroethane and the isopropanol used in formulating the solvents according to our invention may be those available in commerce, no special steps being necessary to purify these solvents. We have found that small amounts of some impurities in the azeotrope make very little difference to the properties of the azeotrope. Thus, for example a bath of azeotrope was in continuous use over a period of 3 months. At the end of this period the azeotrope was contaminated with material removed from the work but we found that there had been no breakdown of the constituent solvents and that the vapour over the liquid solvent still had the same composition as the azeotrope.

Solvent compositions according to our invention, and particularly the azeotrope, are useful in the following applications.

(1) Removal of soldering fluxes from electrical equipment, in particular from equipment in which the composition is likely to come into contact with materials such as plastics or resins.

(2) Cleaning of photographic film or magnetic recording tapes. In certain cases use of our present compositions may obviate the use of ultrasonic cleaning or of hand or mechanical wiping.

(3) Packed in aerosol containers from which the contents are ejected through a nozzle by the vapour pressure in the package on opening a valve. The vapour pressure in the aerosol container being augmented by the presence of a conventional liquefield gas aerosol propellent.

(4) Removal of isopropanol or 1,1,2-trichloro-1,2,2-trifluoroethane from a system containing it by conversion of either of these solvents to the azeotrope and removal of the azeotrope by distillation.

(5) In the manufacture of toilet preparations, for example after- and pre-shave lotions.

(6) In removing contamination, for example a polishing compound, from optical components (for example lenses) when mounted in plastic frames or holders.

The invention is illustrated but not limited by the following examples in which the parts and percentages are by weight.

Example 1

Printed circuit boards made of resin-bonded paper and contaminated with the soldering flux known in commerce as "Multi-Core Solder Limited PC.10.a" were immersed for 30 seconds in a boiling isopropanol/1,1,2-trichloro-1,2,2-trifluoroethane mixture of azeotropic composition. All traces of the flux residues were removed by this treatment without damaging the boards.

Example 2

Printed circuit boards made of Bakelite, which had been assembled and soldered on a flow soldering machine were completely cleaned of all traces of "Fry's Flow Flux S.64" by a 1 minute immersion in an ultrasonically agitated (40/kc./second) azeotropic mixture of isopropanol and 1,1,2-trichloro-1,2,2-trifluoroethane at a temperature of 30° C.

Example 3

Printed circuit boards made of fibreglass were successfully treated for the removal of Enthoven "Super Speed" Flow Flux by a 45 second immersion in an azeotropic mixture of isopropanol and 1,1,2-trichloro-1,2,2-trifluoroethane at 25° C. ultrasonically agitated at a frequency of 25 kc./second.

Example 4

Printed circuit boards made from resin-bonded paper and contaminated with "Fry's S.64 Flow Flux" were immersed in a mixture of 5% isopropanol and 95% 1,1,2-trichloro-1,2,2-trifluoroethane for 1 minute at a temperature of 20° C. during which time the mixture was ultrasonically agitated at a frequency of 40 kc./second. This treatment removed all the flux.

Example 5

Spectacle frames made from cellulose nitrate and from cellulose acetate and heavily contaminated with polishing compounds were cleaned satisfactorily by immersion for 2 minutes in an ultrasonically (40 kc./second) agitated bath at 35° C., the bath consisting of an azeotropic mixture of isopropanol and 1,1,2-trichloro-1,2,2-trifluoroethane together with 0.15% of cetylpyridinium bromide.

Example 6

Plastic spectacles whose frames were made of cellulose acetate and having perspex lenses were satisfactorily cleaned of polishing compound by immersion for 90 seconds in an ultrasonically agitated (25 kc./second) bath at 35° C., the bath consisting of an azeotropic mixture of isopropanol and 1,1,2-trichloro-1,2,2-trifluoroethane together with 0.3% of didodecyl 2-methyl ammonium chloride.

What we claim is:

An azeotropic composition consisting of about 97% by weight 1,1,2-trichloro-1,2,2-trifluoroethane and about 3% by weight isopropanol.

References Cited

UNITED STATES PATENTS

| | | | |
|---|---|---|---|
| 2,704,733 | 3/1955 | Pearsall | 252—153 X |
| 2,999,816 | 9/1961 | Bennett et al. | 252—171 |
| 3,085,116 | 4/1963 | Kvalnes | 260—652.5 |

FOREIGN PATENTS 672,821  10/1963  Canada.

OTHER REFERENCES

Concise Chemical and Technical Dictionary, Bennett, (1962—2nd Edition) Chem. Pub. Co. Inc. New York, (page 524 relied on).

LEON D. ROSDOL, *Primary Examiner.*

J. T. FEDIGAN, *Assistant Examiner.*